May 28, 1940.  E. C. BRODIN  2,202,769
SEAL FOR ENCLOSED BEARINGS
Filed Dec. 3, 1938
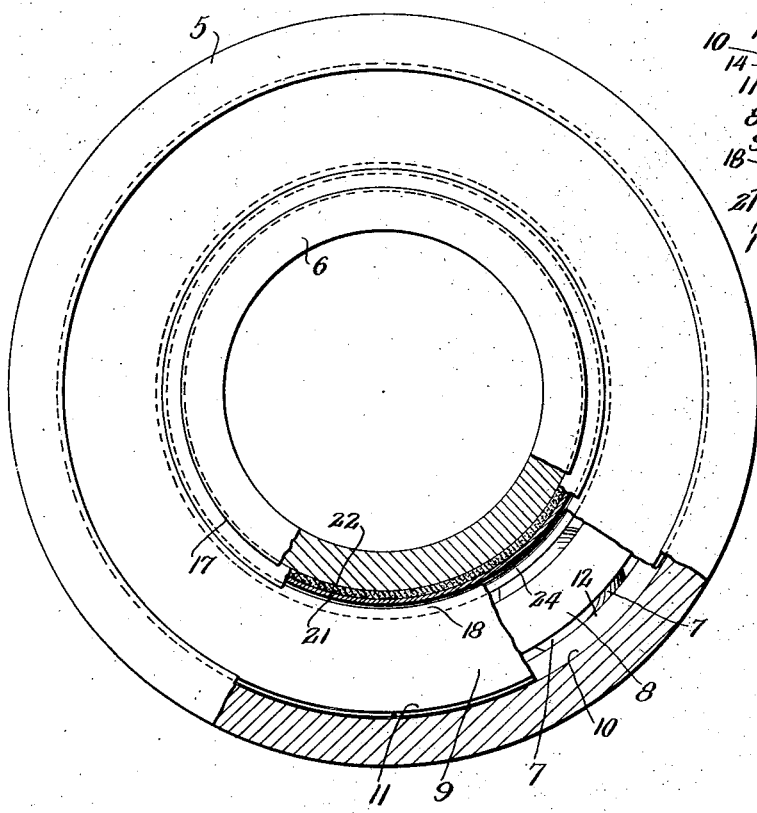
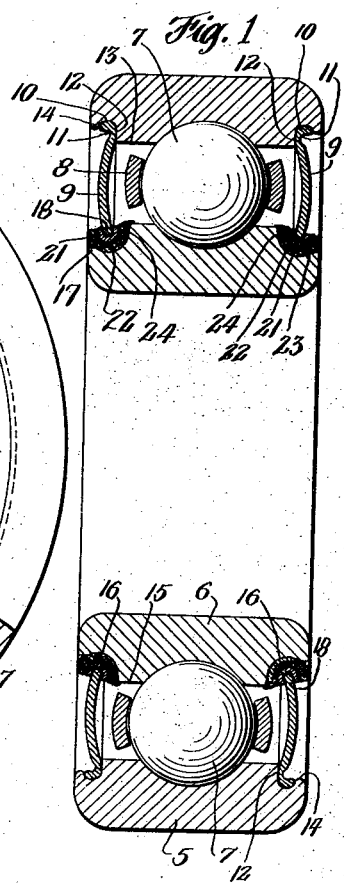
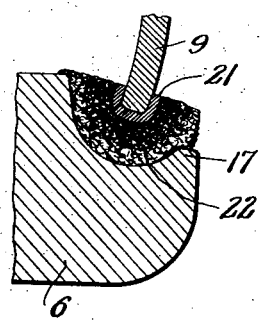
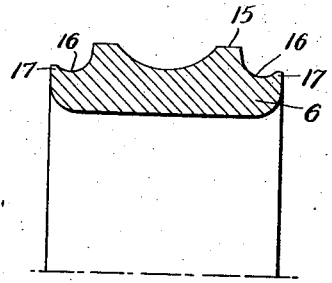
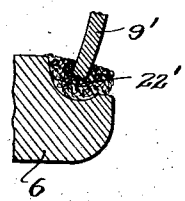
INVENTOR
Eric C. Brodin
BY
HIS ATTORNEY Patented May 28, 1940

2,202,769

UNITED STATES PATENT OFFICE 2,202,769

SEAL FOR ENCLOSED BEARINGS

Eric C. Brodin, Jenkintown, Pa., assignor to S K F Industries, Inc., Philadelphia, Pa., a corporation of Delaware Application December 3, 1938, Serial No. 243,705

2 Claims. (Cl. 286—5)

This invention relates to means for closing the space between two members, in the particular form of the invention I have illustrated herein, that is, for closing the space between the rings of a ball bearing.

The invention consists principally in applying a body, preferably an absorbent material which may be felt, to the edge of a plate which is attached to one member of a pair of members and which runs close to the other member, preferably running in a groove formed therein. The material which is employed in this case is preferably felt bonded to sheet metal, that is, the felt coheres to the metal throughout. The invention also consists in securing one edge of the plate to a part, for instance the outer ring of a bearing, and the other ring, as for instance, the inner ring of a bearing, is preferably formed with a groove, a plate is secured to the outer ring and is provided in its center with an opening. Within such opening and engaging the edge thereof, is a sheet of material to the outer side of which the felt coheres. By edges is meant the wall of the hole or opening in the plate and its two sides near such hole. There is but a slight engagement between the felt and the edge of this groove.

In another form of the invention, the felt itself engages the wall of the opening and the sides of the plate adjacent thereof. Otherwise, the structure is the same.

In the drawing accompanying this specification, two practicable forms of my invention has been illustrated, in which drawing Figure 1 is a central longitudinal section of an improved bearing to which my invention has been applied.

Figure 2 is the face view of the device shown in Figure 1, the outer edge of the felt and its carrying plate being shown broken away, and in another place this and the plate are broken away to show the part within.

Figure 3 shows a section of the inner ring of the bearing.

Figure 4 is an enlarged view of a cross section of a part of the mounting, and

Figure 5 is an enlarged cross section of another form of the mounting.

It will be observed at the beginning of this description that the drawing is exaggerated especially as to the members 21 and 22.

The invention is shown applied to a ball bearing. The particular form of ball bearing is a deep groove radial bearing, there being an outer race ring 5 and an inner race ring 6 held together by a series of balls 7. The cage, which may be of some convenient form is shown at 8. Mounted in the outer ring of the bearing in the present showing, on each side of the balls and cage is shown a plate 9. This plate enters a groove 10 in the outer ring of the bearing, it having been fastened in place in the present illustration by rolling a groove 11 in it near its outer edge, the metal 12 serving as an anvil where the portion 13 of the metal extends inwardly beyond the lip 14 of the groove. The plate is preferably bent outwardly. The inner ring is formed beyond its lands 15 with a groove 16 which is somewhat circular in cross section. One side, as the side 17, is of greater diameter than is the other side represented by the land 15.

As will be seen by the drawing the end 18 of the plate 9 does not reach the inner ring, but falls short in so doing quite a distance. Before mounting the plate 9 in the bearing I apply to it a plate which consists on the inner side of a material which may be bent and stay bent, as for instance metal 21, having bonded to the inner side some material as for instance felt 22. This plate preferably comes up about as high as the inner land 15 and when applied to the bearing may be substantially in the form shown.

As will be noticed particularly in connection with Figure 4 the felt 22 barely touches the inner ring 6, although as it approaches the portion 21 it becomes more dense.

As illustrated in Figure 5, sometimes I cause the felt $22^1$ to cohere directly to the plate $9^1$. In this construction also the felt barely touches the wall of the groove in the ring 6.

The manner of sealing the plate 9 at 11 is such that a secure and tight joint is afforded, and the plate 9 either stays stationary with the outer ring 5, or revolves with it as the bearing is mounted. Consequently, either of these parts moves or remains stationary responsive to the movement or remaining stationary of the inner ring 6.

In practice it has been found desirable to have but a slight engagement between the felt and the inner ring although this is a matter of preference.

Although but two forms of my invention have been illustrated, yet changes may be made within the scope of my claims without departing from the spirit of my invention.

Having thus described my invention, I claim and desire to secure by Letters Patent the following:

1. The combination with an outer member having a circular opening, an inner circular member, a plate having a circular opening surrounding the inner member and secured to the outer member, and a felt piece within the opening and extending outwardly a short distance on each side and secured to the wall of the opening and the sides of the plate adjacent thereto.

2. The combination with an outer member having a circular opening, an inner circular member having a groove, a plate having a circular opening surrounding the inner member and secured to the outer member, and a cohered felt and rigid piece occupying the groove, the rigid portion being bent around the opening in the plate, the felt being innermost and barely touching the wall of the groove.

ERIC C. BRODIN.